(12) United States Patent  
Morson

(10) Patent No.: US 12,504,169 B2  
(45) Date of Patent: Dec. 23, 2025

(54) GAS TURBINE ENGINE

(71) Applicant: ROLLS-ROYCE plc, London (GB)

(72) Inventor: Lloyd D Morson, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/904,352

(22) Filed: Oct. 2, 2024

(65) Prior Publication Data

US 2025/0109854 A1 Apr. 3, 2025

(30) Foreign Application Priority Data

Oct. 2, 2023 (GB) ...................................... 2315091

(51) Int. Cl.
| | |
|---|---|
| *F23R 3/00* | (2006.01) |
| *F01D 9/02* | (2006.01) |
| *F01D 25/24* | (2006.01) |
| *F02C 3/06* | (2006.01) |
| *F23R 3/42* | (2006.01) |
| *F23R 3/50* | (2006.01) |
| *F23R 3/60* | (2006.01) |

(52) U.S. Cl.
CPC .............. *F23R 3/002* (2013.01); *F01D 9/023* (2013.01); *F01D 25/246* (2013.01); *F02C 3/06* (2013.01); *F23R 3/42* (2013.01); *F23R 3/50* (2013.01); *F23R 3/60* (2013.01)

(58) Field of Classification Search
CPC .......... F01D 25/246; F01D 9/023; F23R 3/50; F23R 3/002; F23R 3/60; F23R 3/42; F02C 3/06

See application file for complete search history.

(56) References Cited

U.S. PATENT DOCUMENTS

| | | | |
|---|---|---|---|
| 3,670,497 A | | 6/1972 | Sheldon |
| 5,333,443 A | * | 8/1994 | Halila ........................ F23R 3/60 |
| | | | 60/752 |
| 6,464,453 B2 | * | 10/2002 | Toborg .................... F01D 5/081 |
| | | | 415/174.4 |

(Continued)

FOREIGN PATENT DOCUMENTS

| | | |
|---|---|---|
| CN | 108592086 A | 9/2018 |
| RU | 2 367 799 C2 | 9/2009 |

OTHER PUBLICATIONS

Feb. 5, 2024 Search Report issued in British Patent Application No. 2315091.5.

(Continued)

*Primary Examiner* — Kyle Robert Thomas

(74) *Attorney, Agent, or Firm* — Oliff PLC

(57) ABSTRACT

A combustor assembly (16) for a gas turbine having an annular combustor body and an annular combustor rear. The combustor body and the combustor rear are connected by: i) fit between a radially outer surface of the radially outer wall of the combustor rear and a radially inner surface of the radially outer wall of the combustor body, ii) fit between a radially inner surface of the radially inner wall of the combustor rear and a radially outer surface of the radially inner wall of the combustor body, and iii) one or more retention pins extending radially through respective apertures in the combustor body and in the combustor rear. The combustor rear tapers towards the engine axis as it extends rearwardly.

19 Claims, 4 Drawing Sheets

(56) References Cited

U.S. PATENT DOCUMENTS

| | | | | |
|---|---|---|---|---|
| 7,836,702 | B2 * | 11/2010 | Grivas | F01D 9/023 |
| | | | | 60/788 |
| 8,141,371 | B1 * | 3/2012 | Habarou | F23R 3/007 |
| | | | | 60/753 |
| 9,423,129 | B2 * | 8/2016 | Graves | F23R 3/002 |
| 10,816,199 | B2 * | 10/2020 | Corsmeier | F23R 3/007 |
| 2002/0184888 | A1 | 12/2002 | Calvez et al. | |
| 2002/0184891 | A1 | 12/2002 | Conete et al. | |
| 2003/0000223 | A1 | 1/2003 | Conete et al. | |
| 2022/0390115 | A1 | 12/2022 | Sampath et al. | |

OTHER PUBLICATIONS

Mar. 13, 2025 Extended European Search Report issued in European Patent Application No. 24204140.8.

* cited by examiner

GAS TURBINE ENGINE

FIELD

The present disclosure relates to a gas turbine engine for air vehicles, and more specifically to a gas turbine engine with specified relative component dimensions and even more specifically to a gas turbine combustor arrangement.

BACKGROUND

Gas turbine engines have been developed to provide power for many different air applications including hobby, defence and civil. Each industry has their own requirements and although the present disclosure has been written with a primary focus on civil it will be appreciated that an engine with the specified relative component dimensions may also be used for appropriate products in the defence industry.

Whilst some individuals may naively suggest that conventional gas turbines could be scaled to a small size the skilled person would appreciate that simply scaling components of a known engine type may not provide a corresponding scaling of power, thrust and/or efficiency. Particularly for smaller engines the size required for installation of a scaled engine may provide insufficient thrust, power or efficiency and concomitantly a scaled engine providing sufficient thrust, power or efficiency may be inappropriately large for installation on an airframe. Reconsideration of engine parameters may therefore be appropriate.

Small hobby aircraft sometimes use gas turbines engines as their power source. The scale of these may be too small to be beneficial for commercial use which may require transport of high value cargo items, such as people and/or cargo many times more valuable than the cost of the engine. Commercial use engines may face a more stringent regulatory approval than model aircraft. Accordingly model aircraft may be simplified below a level that would be approved in the commercial market and the skilled person would appreciate that an engine produced for entertainment purposes may not provide sufficient reliability, etc. to meet the requirements set by the FAA, the CAA, or EASA.

Additionally, commercial aircraft may have to operate for longer periods than hobby aircraft without refuelling. Thrust levels must be maintained whilst carrying the requisite combined weight of fuel and load. Hobby engines in their simplicity may lack the fuel efficiency and/or thrust levels required to deliver cargo over the required range for an amount of carried fuel.

The skilled person would appreciate that, if the overall size of a gas turbine engine is decreased, one problem that may need to be addressed is how to ensure a sufficient thrust level is maintained. This is of interest for air vehicles where a finite amount of fuel is available and particular thrust and fuel efficiency is required to maintain the vehicle in flight for a given operational period. It would be appreciated that this may not be a factor for ground-based gas turbine engines such as those providing electrical generative power, or those where fuel is easily resupplied, or the fuel-tank size is not a significant limiting factor.

The skilled person would also appreciate that greater thrust levels may be achieved in a smaller size engine that is arranged as a turbojet rather than a turbofan. However, the skilled person would also understand that turbojets are noisier than turbofans and have a significantly worse Specific Fuel Consumption (SFC) and may require significantly higher volumes of fuel. The noise is likely to be unacceptable in civil operations and may require extra fuel to be carried at the expense of passengers and cargo.

The skilled person would appreciate that simply scaling components of a known engine type may not provide a corresponding scaling of the operational window of the engine. For example, insufficient air and fuel mixing volumes and/or combustion volumes may induce problems with flame stability, relight and stable thrust. Some components may scale differently to other components.

Manufacturing tolerances of components and systems at smaller scales become increasingly important. Axial compressors become highly sensitive at very small scale with, for example, surface finish, tip clearance, stage spacing, etc. having to be so precise that quality control in manufacturing would reject an increasing number of parts resulting in uneconomic manufacture. Similarly, in flight damage, wear, dirt, or other minor issues would take the component or system away from acceptable tolerance leading to early replacement and additional cost that is likely to be unacceptable to economic operation. Reconsideration of engine parameters may therefore be appropriate.

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

As used herein, the terms upstream and downstream denote relative locations along the axial centreline of the engine in the direction of the main intended use airflow through the engine. Axially forward and axially rearward denote relative locations along the axial centreline of the engine in the direction of the main intended use airflow through the engine.

The skilled person will appreciate that equivalent units should be selected for the fan face area, turbine diameter and core length—e.g. if the area is given in m$^2$, the lengths should both be provided in metres. If the volume is given in m$^3$, the lengths should be provided in metres.

SUMMARY

According to one aspect there is provided a combustor arrangement for a gas turbine, the arrangement comprising:
a. an annular combustor body (81) extending about an axis (9), the combustor body comprising a radially outer wall (53), a radially inner wall (51) and a combustor head (59) connecting the radially outer wall (53) and the radially inner wall (51);
b. an annular combustor rear (83) extending about the axis, the annular combustor rear comprising a radially inner wall (87) which extends from an upstream end to a downstream end and a radially outer wall (85) which extends from an upstream end to a downstream end and a plurality of guide vanes (57) connecting the downstream end of the radially inner wall (87) and the downstream end of the radially outer wall (85);
wherein a radially outer surface of the upstream end of the radially outer wall (85) of the combustor rear (83)

contacts the radially inner surface of the radially outer wall (53) of the combustor body (81); and wherein a radially outer surface of the downstream end of the radially outer wall (85) of the combustor rear (83) is spaced from the radially inner surface of the radially outer wall (53) of the combustor body (81).

The combustor body and the combustor rear may be connected by one or more of an interference, or transition, fit between a radially outer surface of the radially outer wall of the combustor rear and a radially inner surface of the radially outer wall of the combustor body.

The combustor body and the combustor rear may be connected by an interference, transition, or clearance, fit between a radially inner surface of the radially inner wall of the combustor rear and a radially outer surface of the radially inner wall of the combustor body.

The combustor body and the combustor rear may be connected by one or more retention pins extending radially through respective apertures in the combustor body and in the combustor rear.

The combustor arrangement may be located in a gas turbine engine for an aircraft. The engine may comprise an engine core having a core length and comprising a first turbine, a multistage axial compressor, and a core shaft connecting the first turbine to the axial compressor.

The engine core may further comprise a second turbine, and a fan shaft connecting the second turbine to a fan located upstream of the engine core, the fan comprising a plurality of fan blades extending from a hub, the fan having a tip radius measured in mm.

The fan tip radius may be measured between a centreline of the engine and an outermost tip of each fan blade at its leading edge—this may equivalently be described as the fan tip radius being defined as the radial distance between a centreline of the engine and an outermost tip of each fan blade at its leading edge. The fan face area may be equal to $\pi$ multiplied by the square of the fan tip radius.

The annular combustor body and the annular combustor rear may define a combustor volume measured in litres in flow series between the compressor and the turbine wherein the combustor volume divided by the fan tip radius is in the range 0.015 to 0.083.

The combustor may have one or more fuel injectors at an upstream end.

The combustor radial distance ($C_{RD}$) is defined as the distance between the inner wall and the outer wall of the combustor body and may be in the range: 50 mm to 110 mm, optionally in the range 50 mm to 85 mm, and further optionally in the range 80 mm to 110 mm. Within these ranges the radial distance may be above 50 mm, or 55 mm, or 60 mm or 65 mm, or 70 mm or 75 mm or 80 mm or 85 mm or 90 mm, or 95 mm, or 100 mm or 105 mm.

The ratio of combustor radial distance to fan radius may be of the order 0.35 to 0.60, and optionally in the range 0.40 to 0.55, and further optionally in the range 0.45 to 0.55, and further optionally in the range 0.40 to 0.50.

The axial distance between the downstream end of the fuel injector and upstream end of the guide vane may be in the range: 70 mm to 170 mm, optionally in the range 70 mm to 125 mm, and further optionally in the range 80 mm to 125 mm, and further optionally in the range 120 mm to 170 mm. Within these ranges the axial distance may be above 70 mm, or 75 mm, or 80 mm, or 85 mm, or 90 mm, or 95 mm, or 100 mm, or 105 mm, or 110 mm or 115 mm, or 120 mm.

The combustor volume may be in the range: 1.4 L to 20 L, optionally in the range 2.3 L to 13.3 L, and further optionally in the range 2.3 L to 7 L, and further optionally in the range 5 L to 13.3 L. Within these ranges the combustor volume may be above 1.5 L, or 2.5 L or 3.5 L, or 4.5 L, or 5.5 L, or 6.5 L, or 7.5 L, or 8.5 L or 9.5 L, or 10.5 L, or 11.5 L, or 12.5 L, or 13.5 L, or 14.5 L, or 15.5 L, or 16.5 L, or 17.5 L, or 18.5 L or 19.5 L.

For an engine with a fan tip radius in the range from 110 mm to 225 mm the combustor volume may be in the range from 1.4 L to 20 L. Optionally, for example for an engine with a fan tip radius in the range from 150 mm to 180 mm the combustor volume may be in the range from 2.3 L to 13.3 L. Optionally, for example for an engine with a fan tip radius in the range from 150 mm to 175 mm the combustor volume may be in the range 4.5 L to 10.5 L.

The combustor volume in litres divided by the fan tip radius in mm may be in the range 0.015 to 0.083, optionally in the range 0.015 to 0.044, optionally in the range 0.015 to 0.036, optionally in the range 0.033 to 0.083, optionally in the range 0.033 to 0.068, optionally in the range 0.024 to 0.046.

Defining the combustor dimensions may allow more stable operation at various altitudes and speeds. A requirement of aero gas turbines that is not shared with land or marine based gas turbines or with hobby aircraft that typically fly below 150 metres is that altitude and therefore ambient pressures and temperatures will vary significantly during the operation of the engine. The gas turbine should be able to operate continuously throughout its flight and/or have a robust restart mechanism. The combustor dimensions defined herein are configured to assist relight. The ratio of combustor dimensions to the fan tip radius may be greater than in known gas turbine engines.

It will be appreciated that scaling the combustor from known engine dimensions may provide a combustor that does not enable sufficient energy to be extracted from the fuel and power the engine over the required operational parameters, fail to ignite at altitude, or exhibit a greater than acceptable risk of flame-out during operation. However, providing a sufficiently sized combustor to meet regulatory operational specifications is a significant challenge that may require novel mounting arrangements and configurations that allow an appropriate volume to be provided within the constraints of a small engine yet still provide the required support for thermal expansion and vibration mitigation as well as controlling the axial and circumferential positioning of the combustion sub-assembly.

For axial engines with a fan tip radius below 225 mm the combustor volume may become the limiting factor which defines the minimum radius of the engine. The high relative volume to the rest of the gas path including the size of the guide vanes to high pressure turbine means that a solution is required which not only enables a relatively large combustor volume but also an appropriately sized guide vane to the high pressure tubine.

The combustor body may be a monolithic structure in that the radially outer wall, the radially inner wall and the combustor head are provided in a single one-piece unit. The body may be formed by additive manufacture. The body may be formed from a moulded sheet of metal that is subsequently machined. The body may have one or more rows of dilution holes in the radially outer wall and/or the radially inner wall with the rows being spaced axially. The dilution holes in a row may be circumferentially offset from the apertures in another row.

The radially outer wall may comprise a plurality of axially extending wings that provide a downstream edge of the wall. The wings may be provided by an axially curved profile that repeats around the circumference of the outer wall and the profile may be sinusoidal or a sinusoidal derivative. A retaining aperture may be provided in each wing suitable for receiving a retention pin where this is used to attach the combustor body to a radially outer combustor casing.

The combustor rear may be a monolithic structure in that the radially outer wall, the radially inner wall and the plurality of guide vanes are provided in a single one-piece unit. The combustor rear may be formed by additive manufacture.

At the upstream end of the combustor rear the radially outer surface of the radially outer wall may provide an interference fit with a radially inner surface of the radially outer wall of the combustor body.

The upstream end of the radially outer wall of the combustor rear may comprise a flange which contacts and is coaxial with the combustor body. The flange may extend axially forward of the point where the combustor rear diverges from the combustor body. The flange may extend axially rearward of the point where the combustor rear diverges from the combustor body.

The portion of the flange which extends rearwardly from the point where the combustor rear diverges from the combustor body may comprise a plurality of retention apertures suitable for receiving a retention pin where this is used to attach the combustor body to the combustor rear.

At the upstream end of the combustor rear the radially inner surface of the radially inner wall may provide an interference fit with a radially outer surface of the radially inner wall of the combustor body.

The upstream end of the radially inner wall of the combustor rear may comprise a flange which is coaxial with the combustor body. The flange may extend axially forward of the point where the combustor rear diverges from the combustor body. The flange may extend axially rearward of the point where the inner wall of the combustor rear diverges from the combustor body.

The downstream end of the radially outer wall of the combustor rear may have a radius from the centre line of the engine that is less than the radial distance of the upstream end of the radially outer wall of the combustor rear.

The downstream end of the radially inner wall of the combustor rear may have a radius from the centre line of the engine that is greater than the radial distance of the upstream end of the radially inner wall of the combustor rear.

The plurality of guide vanes may be located at the downstream end of the combustor rear.

A cylinder may extend rearwardly from the radially outer wall of the combustor rear and may comprise a plurality of retention apertures suitable for receiving a retention pin where this is used to attach the combustor body to the combustor rear.

The retention apertures of the combustor rear may be provided with a locking mechanism such as a screw thread, groove, or projection.

The retention apertures of the combustor rear may align both axially and circumferentially with the retention apertures in the combustor body.

The combustor assembly may further comprise an outer casing within which the combustor body and combustor rear may be located. The outer casing may comprise a plurality of retention apertures suitable for receiving a retention pin where this is used to attach the outer casing to the combustor body and/or the combustor rear.

The retention apertures of the outer casing may align both axially and circumferentially with the retention apertures in the combustor body. The retention apertures of the outer casing may align both axially and circumferentially with the retention apertures in the combustor rear.

A retention pin may extend through the retention apertures in the outer casing, the combustor body and/or the combustor rear to hold them in axial and circumferential alignment.

The combustor assembly may further comprise a combustor body inner casing (CBIC) which may be located radially inboard the combustor body and combustor rear. The CBIC may be provided with a combustor rear inner casing (CRIC) that supports the combustor rear and holds it in axial position.

An abradable seal may be provided on the combustor rear casing (CRIC) downstream of, and radially inboard of, a point of intersection of the first flange and the second flange. The abradable seal may be integrally formed with the combustor rear casing. The abradable seal may be formed by additive manufacture.

According to an aspect there is provided a method of providing a combustor assembly for a gas turbine, the method comprising: providing an annular combustor body comprising a radially outer wall, a radially inner wall and a combustor head connecting the radially outer wall and the radially inner wall; providing an annular combustor rear comprising a radially inner wall and a radially outer wall and a plurality of guide vanes connecting the radially inner wall and the radially outer wall; inserting the combustor rear partially inside the combustor body to provide i) an interference or transition fit between a radially outer surface of the radially outer wall of the combustor rear and a radially inner surface of the radially outer wall of the combustor body), and ii) an interference, transition or clearance fit between a radially inner surface of the radially inner wall of the combustor rear and a radially outer surface of the radially inner wall of the combustor body; and providing one or more retention pins extending radially through respective apertures in the combustor body and in the combustor rear.

The method may further comprise providing a combustor chamber inner casing (CCIC) radially inboard of the radially inner wall and a combustor rear inner casing (CRIC), the method including the step of presenting the CRIC to the combustor rear and to the CCIC, providing an axial load to move the CRIC relative to the CCIC and the combustor rear to provide an interference or transition fit between the CRIC and the CCIC and an interference or transition fit between the CRIC and the combustor rear.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The skilled person will appreciate that a feature described above in relation to any one of the aspects may be applied, mutatis mutandis, to any other aspect of the invention. For example, in various embodiments any two or more of the conditions for ratios as defined above, and optionally all specified ratio ranges, may apply to any given aspect or embodiment. All aspects may apply to an engine of some embodiments. Furthermore, any feature described below may apply to any aspect and/or may apply in combination with any one of the claims.

The gas turbine engine as described and/or claimed herein may have any suitable general architecture. For example, the drive connecting the compressor and the turbine may be a shaft extending between the turbine and the compressor. The drive may be provided by a drive arm extending rearwardly from the compressor that interfaces directly with the turbine such that torque is transmitted. The drive may be provided by a drive arm extending forwardly from the turbine that interfaces directly with the compressor such that torque is transmitted. The drive may be provided by a drive arm extending rearwardly from the compressor that interfaces directly with a drive arm extending forwardly from the turbine such that torque is transmitted between the turbine and the compressor.

In any gas turbine engine as described and/or claimed herein, a combustor may be provided axially downstream of the fan and compressor. For example, the combustor may be directly downstream of (for example at the exit of) the compressor. By way of further example, the flow at the exit to the combustor may be provided to the inlet of the turbine. The combustor may be provided upstream of the turbine.

The compressor may comprise any number of stages. Each stage may comprise a row of rotor blades and a row of stator vanes, which may be variable stator vanes (in that their angle of incidence may be variable). The row of rotor blades and the row of stator vanes may be axially offset from each other.

The turbine may comprise any number of stages, for example multiple stages. Each stage may comprise a row of rotor blades and a row of stator vanes. The row of rotor blades and the row of stator vanes may be axially offset from each other.

The rotational speed of the fan may vary in use. The fan may have one, two or three stages.

A fan blade and/or aerofoil portion of a fan blade described and/or claimed herein according to any aspect may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge which may be manufactured using a material that is better able to resist impact (for example from birds, ice, or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

BRIEF DESCRIPTION OF THE DRAWINGS

Embodiments will now be described by way of example only, with reference to the Figures, in which.

DETAILED DESCRIPTION

Figure 1:
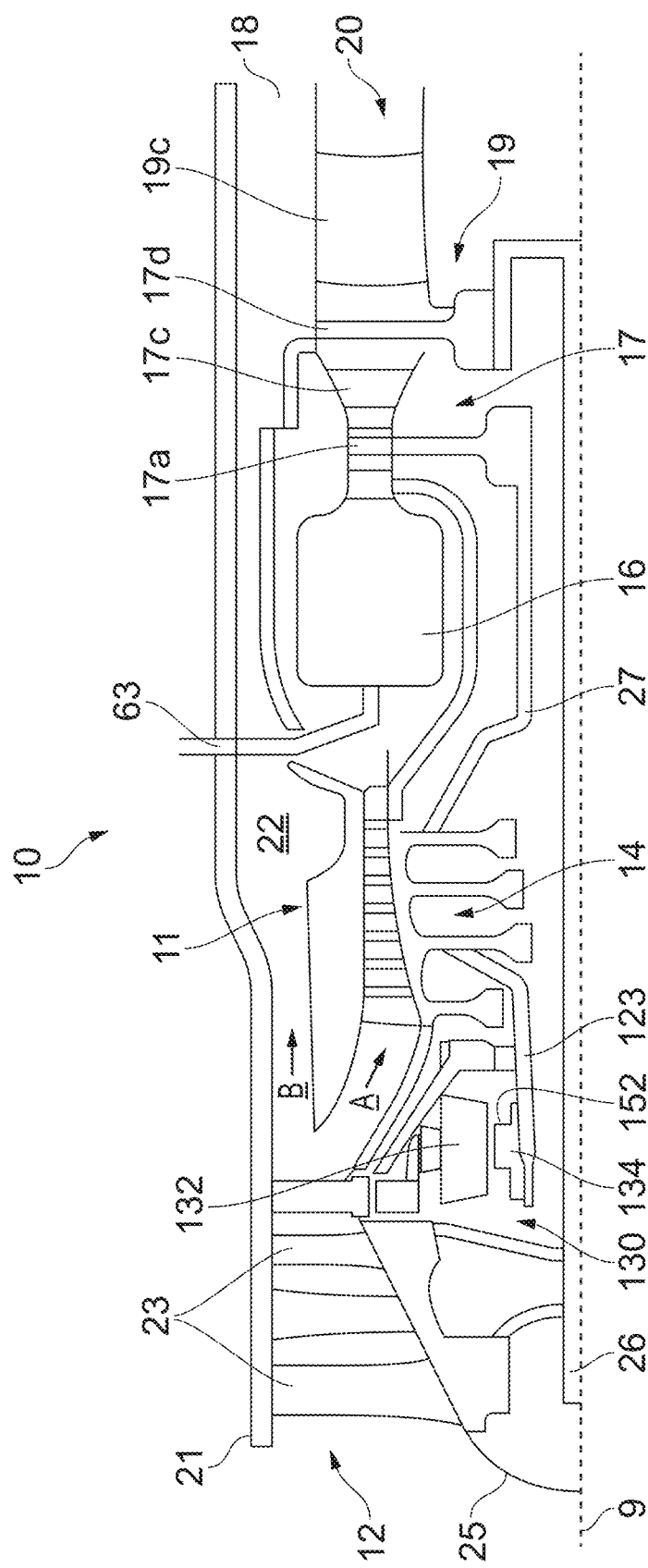
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a compressor 14, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26.

In use, the core airflow A is accelerated and compressed by the compressor 14. The compressed air exhausted from the compressor 14 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the compressor 14 by a suitable interconnecting drive 27. The drive may be a shaft or one or more drive arms extending from the compressor and/or turbine. The fan 23 may provide the majority of the propulsive thrust.

Other gas turbine engines to which the present disclosure may be applied may have alternative configurations. By way of further example, the gas turbine engine 10 shown in FIG. 1 has a mixed flow nozzle meaning that flow through the bypass duct and the flow through the core are mixed or combined, before (or upstream of) a single nozzle. However, this is not limiting, and various aspects of the present disclosure may also apply to engines in which the flow through the bypass duct 22 has its own nozzle 18 that is separate to and radially outside the core engine nozzle 20 this is known as a split flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction. The axial and radial directions are mutually perpendicular.

Referring again to FIGS. 1, the compressor 14 comprises multiple compressor stages. In the embodiment shown in FIG. 1, the compressor 14 comprises four compressor stages. Each stage of the compressor may comprise a row of rotor blades and a row of stator vanes, which may be variable stator vanes (in that their angle of incidence may be variable). The row of rotor blades and the row of stator vanes may be axially offset from each other.

The one or more compressor stages may comprise a lowest pressure stage and may further comprise one or more compressor stages of increasing pressure to a highest pressure compressor stage. The lowest pressure compressor stage may be located furthest upstream along the gas flow path within the lowest pressure compressor 14. The further higher pressure stages may be spaced axially along the gas flow path through the compressor in a downstream (rearward) direction.

The highest pressure turbine 17 similarly comprises one or more turbine stages. In the embodiment shown in FIG. 1, the highest pressure turbine 17 comprises one stage. Each turbine stage may comprise a row of rotor blades 17a and a row of stator vanes 17c, which may be variable stator vanes (in that their angle of incidence may be variable). The row of rotor blades and the row of stator vanes may be axially offset from each other.

The lowest pressure turbine 19 similarly comprises one or more turbine stages. In the embodiment shown in FIG. 1, the lowest pressure turbine 19 comprises one stage. Each turbine stage may comprise a row of rotor blades and a row of stator vanes 19c, which may be variable stator vanes (in that their angle of incidence may be variable). The row of rotor blades and the row of stator vanes may be axially offset from each other.

The one or more turbine stages forming each turbine 17, 19 may comprise a highest pressure stage, and may further comprise one or more turbine stages of decreasing pressure to a lowest turbine pressure stage. The lowest pressure turbine stage may be located furthest downstream within each turbine 17, 19. The further pressure stages are spaced axially in an upstream (forward) direction along the gas flow path through the turbine. In embodiments with only one stage, the single stage is the lowest pressure stage.

The gas turbine engine may comprise an electric machine arrangement, which is configured to produce electrical power, and/or provide motive power to start the engine. The electric machine arrangement comprises a starter generator 130, which comprises an electric machine stator 132 and an electric machine rotor 134 separated by a radial air gap 152. The electric machine rotor 134 is coupled to the compressor forward drive arm 123, while the stator 132 is coupled to static structure. The electric machine 130 is provided forward of the compressor 14, and rearward of the fan 12, in an annular space provided radially inward of the gas flow path.

Figure 2:
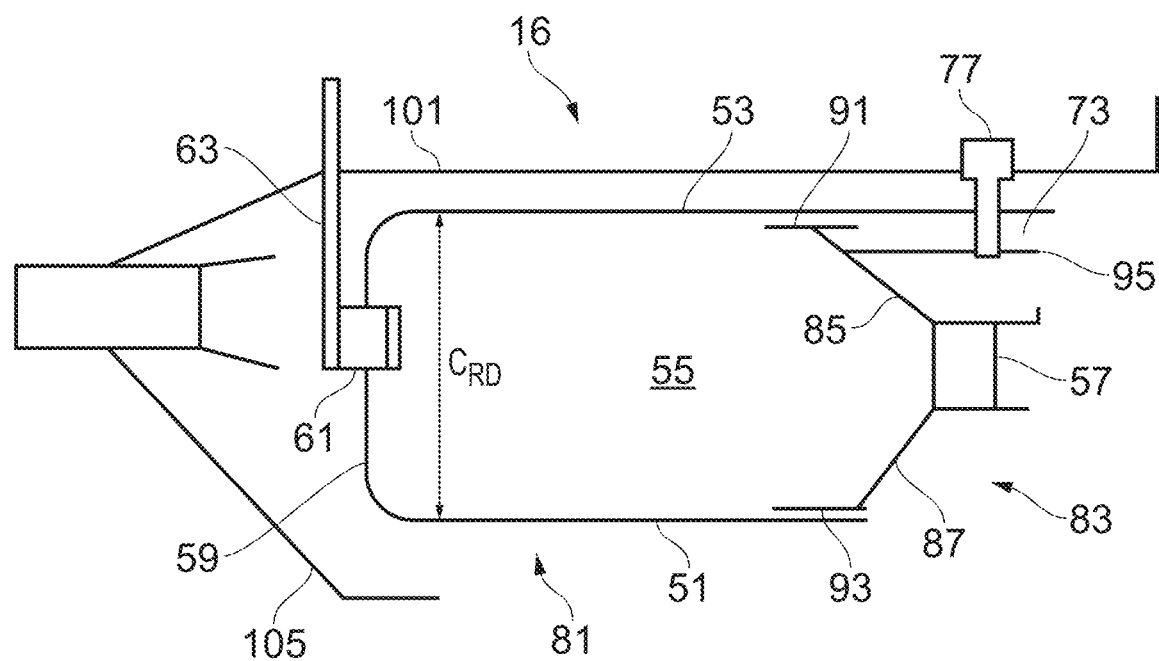
FIG. 2 is a close up sectional side view of a combustor of a gas turbine engine.
Figure 3:
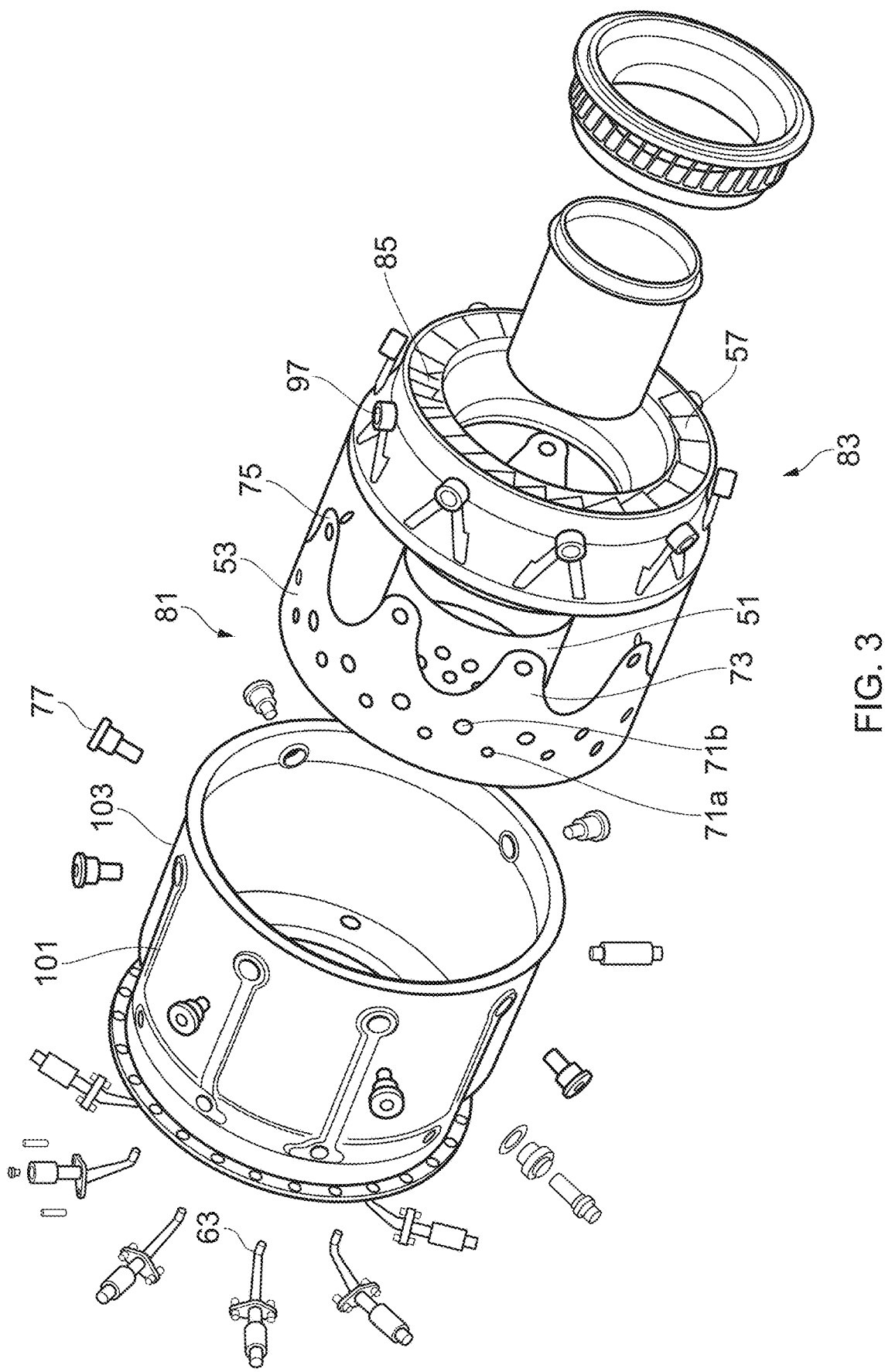
FIG. 3 is a perspective view of the combustor of FIG. 2.

FIG. 2 is a schematic of a cross-section through a combustor assembly of FIG. 1. FIG. 3 is a perspective view of the combustor of FIG. 2. The combustor is an annular combustor having a radially inner wall 51 and a radially outer wall 53. Both are coaxial with the engine axis 9 and together partially define an annular combustion volume 55. A nozzle guide vane 57 is positioned at the downstream end of the combustor to condition the hot combustion gasses before they reach the turbine rotor 17. A radially extending combustor head 59 provides the upstream bound of the combustor and is provided with a circumferential array of injector ports 61 into which an injector 63 is mounted. A swirler configuration provides vents that supply air into the combustor.

Fuel is injected into the combustor volume through the injector where it is mixed with swirling air and ignited.

The combustor radial distance ($C_{RD}$) defined as the radial distance between the inner wall and the outer wall may be in the range: 50 mm to 110 mm, optionally in the range 50 mm to 85 mm, and further optionally in the range 80 mm to 10 mm.

The ratio of combustor radial distance to fan radius may be of the order 0.35 to 0.60, and optionally in the range 0.40 to 0.55, and further optionally in the range 0.45 to 0.55, and further optionally in the range 0.40 to 0.50.

The axial distance between the downstream end of the fuel injector and upstream end of the guide vane may be in the range: 70 mm to 170 mm, optionally in the range 70 mm to 125 mm, and further optionally in the range 80 mm to 125 mm, and further optionally in the range 120 mm to 170 mm.

The combustor volume may be in the range: 1.4 L to 20 L, optionally in the range 2.3 L to 13.3 L, and further optionally in the range 2.3 L to 7 L, and further optionally in the range 5 L to 13.3 L.

For an engine with a fan tip radius in the range from 110 mm to 225 mm the combustor volume may be in the range from 1.4 L to 20 L. Optionally, for example for an engine with a fan tip radius in the range from 150 mm to 175 mm the combustor volume may be in the range from 2.3 L to 13.3 L. Optionally, for example for an engine with a fan tip radius in the range from 150 mm to 180 mm the combustor volume may be in the range 4.5 L to 10.5 L.

The combustor volume in litres divided by the fan tip radius in mm may be in the range 0.018 to 0.083, optionally in the range 0.018 to 0.044, optionally in the range 0.018 to 0.036, optionally in the range 0.033 to 0.083, optionally in the range 0.033 to 0.068, optionally in the range 0.024 to 0.046.

The combustor 16 is formed of multiple parts. The radially outer wall, radially inner wall and the combustor head are provided in a single one-piece unit that provides the combustor body 81. The body is preferably formed by additive manufacture however other methods of manufacture e.g. via a moulded sheet of metal that is subsequently machined may be appropriate.

The combustor body 81 has two rows of dilution holes (71a, 71b) in the radially outer wall 53 and two rows of dilution holes in the radially inner wall 51 with the rows being spaced axially and the dilution holes in adjacent rows being circumferentially offset.

The radially outer wall 53 comprises a plurality of axially extending wings 73 that provides a downstream edge of the wall. The wings are provided by an axially curved profile that repeats around the circumference of the outer wall. A retaining aperture 75 is provided in each wing suitable for receiving a retention pin 77.

The combustor rear 83 is a separate monolithic structure in which a radially outer wall 85, a radially inner wall 87 and a plurality of guide vanes 57 are provided in a single one-piece unit. The combustor rear is preferably formed by additive manufacture.

At the upstream end of the combustor rear the radially outer surface of the radially outer wall provides an interference or transition fit with a radially inner surface of the radially outer wall of the combustor body. To make this fit more robust a flange 91 is provided on the upstream end of the combustor rear outer wall which extends parallel to the outer wall of the combustor body. This increases the surface area of the join. The flange may extend axially rearwardly from the point where the combustor rear diverges from the combustor body may comprise a plurality of retention apertures suitable for receiving a retention pin where this is used to attach the combustor body to the combustor rear.

In some embodiments the interference fit may be substituted with a transition fit that allows limited relative movement between components whilst still providing an appropriate fluid seal.

At the upstream end of the combustor rear the radially inner surface of the radially inner wall provides an interference fit with a radially outer surface of the radially inner wall of the combustor body. To make this fit more robust a flange 93 is provided on the upstream end of the combustor rear inner wall which extends parallel to the inner wall of the combustor body. This increases the surface area of the join.

In some embodiments the interference fit may be substituted with a transition fit or clearance fit that allows limited relative movement between components whilst still providing an appropriate fluid seal.

The downstream end of the radially outer wall of the combustor rear has a radius from the centre line of the engine that is less than the radial distance of the upstream end of the radially outer wall of the combustor rear.

The downstream end of the radially inner wall of the combustor rear has a radius from the centre line of the engine that is greater than the radial distance of the upstream end of the radially inner wall of the combustor rear.

The combustor rear tapers from an upstream end to the downstream end and the plurality of guide vanes 57 is located at the downstream end of the combustor rear and connects the radially outer wall of the combustor rear with the radially inner wall of the combustor rear.

A flange 95 extends rearwardly from the radially outer wall of the combustor rear 83 and comprise a plurality of retention apertures 97 suitable for receiving a retention pin 77.

The retention apertures of the combustor rear may be provided with a locking mechanism such as a screw thread, groove, or projection to prevent unintentional release of the retention pin.

The retention apertures of the combustor rear align both axially and circumferentially with the retention apertures in the combustor body.

Figure 4:
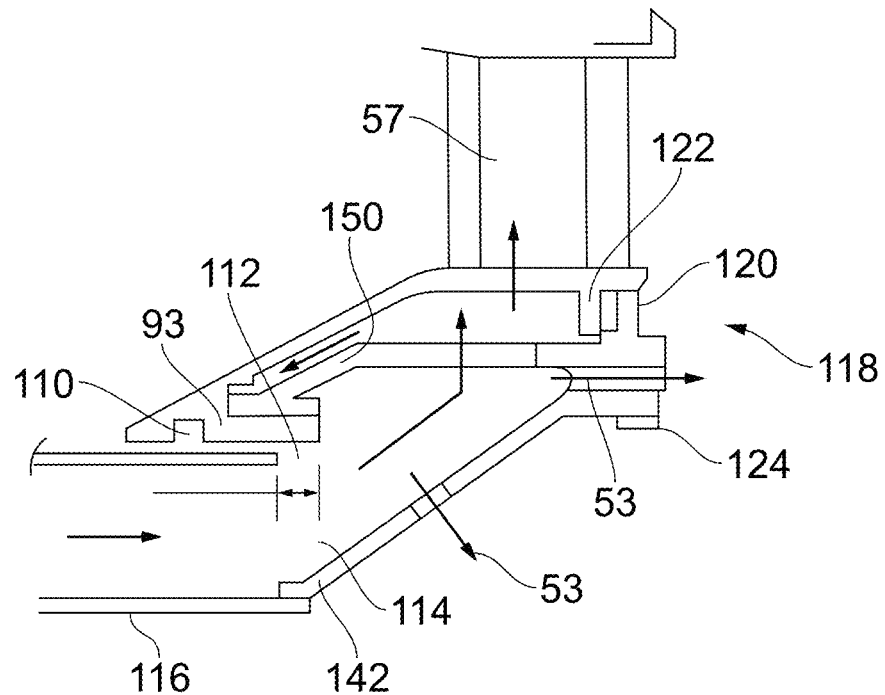
FIG. 4 is a close up sectional side view of an inner casing and support for the combustor of FIG. 2.

As shown in FIG. 4 the flange 93 comprises a circumferential groove 110 that acts as an expansion plenum to reduce the volume of combustion gasses escaping from the combustion chamber and into an outer plenum 114. This has more benefit where the fit between the radially inner wall of the combustor and the radially inner wall of the combustor rear are connected by a transition or clearance fit.

An axial offset 112 between the axially downstream end of the radially inner wall of the combustor body and the downstream end of the flange 93 provides an elegant way to provide a small radial step as well as avoiding a surface for any gas passing through the join to follow in order to reduce the risk of the formation of a low-pressure eddy current.

The combustor assembly further comprises an outer casing (CCOC) 101 within which the combustor body 81 and combustor rear are located 83. The outer casing comprises a plurality of retention apertures 103 suitable for receiving a retention pin and which align both axially and circumferentially with the retention apertures in the combustor body.

To build the combustor assembly the combustor rear 83 and combustor body 81 are first joined together by inserting the upstream end of the combustor rear inside the downstream end of the combustor body to form an interference fit whilst ensuring that their respective retention apertures 75, 97 are aligned. It may be necessary to first heat the combustor body to allow it to expand such that it shrinks on cooling to provide a tighter fit.

The joined combustion chamber is positioned within the combustor outer casing ensuring the retention apertures are aligned following which retention pins 77 are inserter through the retention apertures in the outer casing, combustor body and combustor rear. Where a securing mechanism is used, i.e. screw threads located at the combustor rear retention aperture, these are used to prevent inadvertent release of the retention pins.

A combustor chamber inner casing (CCIC) 116 and combustor rear inner casing (CRIC) 118 provide further support for the combustor arrangement. The outer casing CCOC 101 is formed integrally with a combustor inlet guide vane and diffuser as well as an axially extending casing portion 105 (FIG. 2) that is joined to the upstream end of the CCIC 116 at its downstream end by a light thermal clearance fit to reduce mechanical loading through the compressor guide vanes.

The combustor rear inner casing (CRIC) 118 is provided between the combustor rear 83 and the CCIC 116. Together with the combustor body 81 and the CCIC 116 the CRIC 118 defines plenum 114 that supplies cooling air to the exterior of the combustor arrangement and to the outlet guide vanes 57 which may be hollow. Apertures 53 provide an outlet for air within the plenum 114 to subsequent downstream components such as the turbine or exhaust casing.

The CRIC 118 comprises a first annular flange 142 and a radially separated second annular flange 150. Each flange may have an axial and a radial component. The first annular flange 142 extends axially upstream and radially inwardly to provide a radially inner face that at the axially forward end provides a fit with the radially outer surface of the downstream end of the CCIC 116. The second annular flange 150 extends axially forward to provide a radially inner face that at the axially forward end thereof provides a fit with the radially outer surface of flange 93 of the combustor rear.

Thermal loaded interfaces at the join between the CCIC 116 and the CRIC 118 and at the join between the CRIC 118 and the radially outside of the flange 93 of the combustor rear enable an interference fit as well as tighter packaging, reduced part count, greater flexibility in packaging attenuation, and passive thermal slugging of the CRIC 118. The use of the two interference fits may enable a relaxation on the tolerance of the join between the combustor body and combustor rear thereby permitting a looser fit.

At the downstream end of the CRIC 118 a radially outwardly extending wall 120 cooperates with a radially inwardly extending wall 122 on the combustor rear to provide an annular chamber into which a seal element may be located. This may be an Omega Seal that seals high pressure within the combustion plenum whilst enabling independent thermal growth between the combustor rear comprising the guide vanes and the CRIC 118.

A removeable pin may extend through the CRIC upstream of the radially extending wall 122 on the combustor rear. The pin prevents the CRIC travelling axially downstream relative to the combustor rear and prevents contact of the CRIC with the high pressure turbine disc.

On the radially inner surface of the CRIC 118 there is provided an abradable seal feature 124 that provides a seal between the CRIC and the radially inwardly located high pressure turbine disc seal fins (not shown). Through the described arrangement, under engine running especially during flight transitions, the combustor rear and the guide vanes and the CRIC 118 are able to thermally react independently such that the thermal growth between the abradable CRIC seal 124 and the HPT Disc seal fins is matched. Increased efficiency is enabled by reducing sealing clearance between the CRIC and HPT Disc seal fins.

The abradable seal feature 124 is preferably formed by an additive manufacture process at the same time the CRIC is formed. This method enables a compact integration of the seal with the other components.

In order to assemble the CRIC 118 within the combustor assembly the CRIC is heated and presented to both the combustor rear and the CCIC 116 in the same operation. A calibrated axial load is applied to bring all the components together and compress the seal provided between the radial flanges 120 and 122. A radially extending face may provide a limit to the axial compression of the seal to prevent over compression.

Four circumferentially spaced retention pins are inserted radially through the CRIC 118 upstream of the flange 122 and are secured to act as a secondary retention feature that prevents axial movement of the CRIC relative to the combustor rear.

Figure 5:
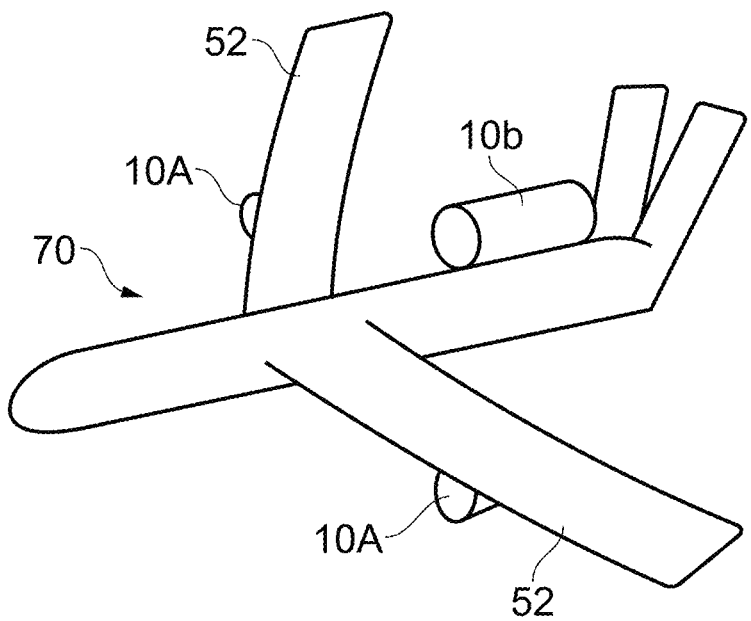
FIG. 5 is a schematic view of an aircraft comprising gas turbine engines in three locations.

FIG. 5 provides a schematic illustration of engines 10a located under the wings 52 of an aircraft 70 and also shows an engine 10b mounted to the top of the fuselage. Either of the engines 10a, or 10b may be removed of altered depending on the required use. It will be appreciated that other configurations may be appropriate such as embedding the engine within the wing, within the fuselage, or elsewhere, and a duct is provided to supply air to the engine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A combustor assembly for a gas turbine, the assembly comprising:
   a. an annular combustor body extending about an axis, the combustor body comprising a radially outer wall, a radially inner wall and a combustor head connecting the radially outer wall and the radially inner wall; and
   b. an annular combustor rear extending about the axis, the annular combustor rear comprising a radially inner wall which extends from an upstream end to a downstream end and a radially outer wall which extends from an upstream end to a downstream end and a plurality of guide vanes connecting the downstream end of the radially inner wall and the downstream end of the radially outer wall, wherein
   a radially outer surface of the upstream end of the radially outer wall of the combustor rear contacts the radially inner surface of the radially outer wall of the combustor body,
   a radially outer surface of the downstream end of the radially outer wall of the combustor rear is spaced from the radially inner surface of the radially outer wall of the combustor body,
   the upstream end of the radially inner wall of the combustor rear and the upstream end of the radially outer wall of the combustor rear comprise respective flanges that are coaxial with the combustor body,
   one or both of the flanges extend axially forward from a point on the respective wall where the respective wall diverges from the combustor body, and
   one or both of the flanges extend axially rearwardly from the point on the respective wall where the respective wall diverges from the combustor body.

2. The combustor assembly according to claim 1, wherein the upstream end of the radially inner wall of the combustor rear has a transition or clearance fit with the radially outer surface or the radially inner wall of the combustor body.

3. The combustor assembly according to claim 2, wherein the downstream end of the radially outer wall of the combustor rear has a radius from the centre line of the engine that is less than the radial distance of the upstream end of the radially outer wall of the combustor rear.

4. The combustor assembly according to claim 3, wherein the downstream end of the radially inner wall of the combustor rear has a radius from the centre line of the engine that is greater than the radial distance of the upstream end of the radially inner wall of the combustor rear.

5. The combustor assembly according to claim 1, wherein one or more retention pins extend radially through respective apertures in the combustor body and in the flange extending axially rearwardly from the radially outer wall of the combustor rear.

6. The combustor assembly according to claim 4, wherein a cylinder extends rearwardly from the radially outer wall of the combustor rear and comprises a plurality of apertures, wherein one or more retention pins extend radially through respective apertures in the combustor body and in the cylinder.

7. The combustor assembly according to claim 5, further comprising an outer casing, the outer casing having apertures, wherein the one or more retention pins extend through a respective aperture therein.

8. The combustor assembly according to claim 7, wherein the apertures of the combustor body are positioned in axially extending wings.

9. The combustor assembly according to claim 8, wherein the apertures in the combustor body and the apertures in the flange or apertures in a cylinder that extends rearwardly from the radially outer wall of the combustor rear are axially aligned with the plurality of guide vanes.

10. The combustor assembly according to claim 1 wherein the combustor body and/or the combustor rear is a monolithic unit.

11. The combustor assembly according to claim 10, wherein the combustor body and/or combustor rear comprise a microstructure indicative of an additive layer manufacturing method.

12. The combustor assembly according to claim 1 further comprising an annular inner casing radially inboard of the radially inner wall of the combustor body and the radially inner wall of the combustor rear wherein a combustor rear casing is provided with a first flange fitting with the annular inner casing and a second flange fitting with the combustor rear.

13. The combustor assembly according to claim 12 further comprising an abradable seal on the combustor rear casing downstream of, and radially inboard of, a point of intersection of the first flange and the second flange.

14. The combustor assembly according to claim 13 wherein the abradable seal is integrally formed with the combustor rear casing.

15. A combustor assembly for a gas turbine, the assembly comprising:
- an annular combustor body extending about an axis, the combustor body comprising a radially outer wall, a radially inner wall and a combustor head connecting the radially outer wall and the radially inner wall; and
- an annular combustor rear extending about the axis, the annular combustor rear comprising a radially inner wall and a radially outer wall and a plurality of guide vanes connecting the radially inner wall and the radially outer wall, wherein
- the combustor body and the combustor rear are connected by: i) an interference or transition fit between a radially outer surface of the radially outer wall of the combustor rear and a radially inner surface of the radially outer wall of the combustor body, ii) an interference, transition or clearance fit between a radially inner surface of the radially inner wall of the combustor rear and a radially outer surface of the radially inner wall of the combustor body, and iii) one or more retention pins extending radially through respective apertures in the combustor body and in the combustor rear,
- an upstream end of the radially inner wall of the combustor rear and an upstream end of the radially outer wall of the combustor rear comprise respective flanges that are coaxial with the combustor body,
- one or both of the flanges extend axially forward from a point on the respective wall where the respective wall diverges from the combustor body, and
- one or both of the flanges extend axially rearwardly from the point on the respective wall where the respective wall diverges from the combustor body.

16. The combustor assembly according to claim 15, wherein a downstream end of the radially outer wall of the combustor rear has a radius from the centre line of the engine that is less than the radial distance of the upstream end of the radially outer wall of the combustor rear.

17. The combustor assembly according to claim 16, wherein the apertures in the combustor body and the apertures in the combustor rear are axially aligned with the plurality of guide vanes.

18. A combustor assembly for a gas turbine, the assembly comprising:
- a. an annular combustor body extending about an axis, the combustor body comprising a radially outer wall, a radially inner wall and a combustor head connecting the radially outer wall and the radially inner wall; and
- b. an annular combustor rear extending about the axis, the annular combustor rear comprising a radially inner wall which extends from an upstream end to a downstream end and a radially outer wall which extends from an upstream end to a downstream end and a plurality of guide vanes connecting the downstream end of the radially inner wall and the downstream end of the radially outer wall, wherein
- a radially outer surface of the upstream end of the radially outer wall of the combustor rear contacts the radially inner surface of the radially outer wall of the combustor body,
- a radially outer surface of the downstream end of the radially outer wall of the combustor rear is spaced from the radially inner surface of the radially outer wall of the combustor body,
- the upstream end of the radially inner wall of the combustor rear has a transition or clearance fit with the radially outer surface or the radially inner wall of the combustor body,
- the downstream end of the radially outer wall of the combustor rear has a radius from the centre line of the engine that is less than the radial distance of the upstream end of the radially outer wall of the combustor rear,
- the downstream end of the radially inner wall of the combustor rear has a radius from the centre line of the engine that is greater than the radial distance of the upstream end of the radially inner wall of the combustor rear, and
- a cylinder extends rearwardly from the radially outer wall of the combustor rear and comprises a plurality of apertures, wherein one or more retention pins extend radially through respective apertures in the combustor body and in the cylinder.

19. A combustor assembly for a gas turbine, the assembly comprising:
- a. an annular combustor body extending about an axis, the combustor body comprising a radially outer wall, a radially inner wall and a combustor head connecting the radially outer wall and the radially inner wall; and
- b. an annular combustor rear extending about the axis, the annular combustor rear comprising a radially inner wall which extends from an upstream end to a downstream end and a radially outer wall which extends from an upstream end to a downstream end and a plurality of guide vanes connecting the downstream end of the radially inner wall and the downstream end of the radially outer wall, wherein
- a radially outer surface of the upstream end of the radially outer wall of the combustor rear contacts the radially inner surface of the radially outer wall of the combustor body,
- a radially outer surface of the downstream end of the radially outer wall of the combustor rear is spaced from the radially inner surface of the radially outer wall of the combustor body, and
- the combustor assembly further comprises
  - an annular inner casing radially inboard of the radially inner wall of the combustor body and the radially inner wall of the combustor rear wherein a combustor rear casing is provided with a first flange fitting with the annular inner casing and a second flange fitting with the combustor rear, and
  - an abradable seal on the combustor rear casing downstream of, and radially inboard of, a point of intersection of the first flange and the second flange.

* * * * *